United States Patent
Williams et al.

(10) Patent No.: US 6,199,151 B1
(45) Date of Patent: Mar. 6, 2001

(54) APPARATUS AND METHOD FOR STORING A DEVICE ROW INDICATOR FOR USE IN A SUBSEQUENT PAGE-MISS MEMORY CYCLE

(75) Inventors: Michael W. Williams, Citrus Heights; Mikal Hunsaker, El Dorado Hills; Robert N. Murdoch, deceased, late of Sacramento, all of CA (US), by Leslie Raderman, legal representative

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/092,591

(22) Filed: Jun. 5, 1998

(51) Int. Cl.[7] .............................. G06F 12/00; G06F 12/10
(52) U.S. Cl. ........................... 711/203; 711/205; 711/206
(58) Field of Search ..................................... 711/100, 104, 711/105, 111, 118, 125, 154, 203, 205, 207, 200, 202; 365/189.08

(56) References Cited

U.S. PATENT DOCUMENTS

| | | | |
|---|---|---|---|
| 5,134,582 | * 7/1992 | Ishii | 365/189.08 |
| 5,479,635 | * 12/1995 | Kametani | 711/5 |
| 5,500,948 | * 3/1996 | Hinton et al. | 711/205 |
| 5,517,634 | * 5/1996 | Ehrlich | 711/105 |
| 5,630,087 | * 5/1997 | Talluri et al. | 711/202 |

* cited by examiner

Primary Examiner—Tuan V. Thai
(74) Attorney, Agent, or Firm—Blakely, Sokoloff, Taylor & Zafman LLP

(57) ABSTRACT

An apparatus and method for selecting a row of memory devices. A row value that indicates one of a plurality of chip select signals is stored in a storage element that is associated with a first address. A memory access request is received that includes the first address. The one of the plurality of chip select signals indicated by the row value is asserted to select one of a plurality of rows of memory devices.

30 Claims, 4 Drawing Sheets

| CHIP SELECT (1 = ASSERTED) | | | | | | | | ENCODED ROW VALUE | | |
|---|---|---|---|---|---|---|---|---|---|---|
| CS: 8 | 7 | 6 | 5 | 4 | 3 | 2 | 1 | BIT: 2 | 1 | 0 |
| 0 | 0 | 0 | 0 | 0 | 0 | 0 | 1 | 0 | 0 | 0 |
| 0 | 0 | 0 | 0 | 0 | 0 | 1 | 0 | 0 | 0 | 1 |
| 0 | 0 | 0 | 0 | 0 | 1 | 0 | 0 | 0 | 1 | 0 |
| 0 | 0 | 0 | 0 | 1 | 0 | 0 | 0 | 0 | 1 | 1 |
| 0 | 0 | 0 | 1 | 0 | 0 | 0 | 0 | 1 | 0 | 0 |
| 0 | 0 | 1 | 0 | 0 | 0 | 0 | 0 | 1 | 0 | 1 |
| 0 | 1 | 0 | 0 | 0 | 0 | 0 | 0 | 1 | 1 | 0 |
| 1 | 0 | 0 | 0 | 0 | 0 | 0 | 0 | 1 | 1 | 1 |

FIG.3

APPARATUS AND METHOD FOR STORING A DEVICE ROW INDICATOR FOR USE IN A SUBSEQUENT PAGE-MISS MEMORY CYCLE

FIELD OF THE INVENTION

The present invention relates to virtual addressing, and more particularly to reducing the amount of time required to access memory in response to a virtual address reference.

BACKGROUND OF THE INVENTION

Many modern computer systems use virtual addressing to hide the underlying complexity of their physical address spaces. A virtual address is an address that must be translated into a physical address before it can be used to access memory. By presenting a computer system's operating memory as a virtual address space, the operating memory may be made to appear larger or less fragmented than it actually is. For example, in a computer system that has a 32 MB (mega-byte) operating memory, an even larger virtual memory may be presented for use by application programs by mapping portions of the virtual memory to a storage other than the operating memory (e.g., a disk drive). If necessary, regions of the virtual address space can be dynamically remapped from a relatively slow mass storage device to operating memory. Also, a physical operating memory that has gaps of unused physical address space (i.e., a fragmented memory) can be made to appear as a contiguous address space in the virtual realm.

One important application of virtual addressing is the storage and retrieval of graphics objects, such as textures, depth information and color information, in operating memory. Because graphics objects are often used to provide real-time visual effects, it is important that graphics objects be retrieved from memory quickly and without spending excessive time translating their virtual address references.

In many computer systems, virtual addresses are translated into physical addresses by a processor (or other bus master) before the processor issues memory access requests to a memory controller. In other computer systems, at least some virtual-to-physical address translation is performed in the memory controller. Performing address translation in the memory controller centralizes the address translation activity and allows virtual addressing to be used by subsystems in the computer system that do not have address translation capability.

One technique for performing virtual-to-physical address translation in a memory controller is to use a translation buffer in conjunction with a lookup table in memory. If a virtual address is received in the memory controller, the memory controller checks to see if a corresponding physical address is stored in the translation buffer (a translation buffer hit). If so, the physical address is output from the translation buffer and used to access memory. If the physical address is not stored in the translation buffer (a translation buffer miss), the physical address is retrieved from the lookup table in memory. The physical address from the lookup table is used to access memory and is also written to the translation buffer to increase the likelihood of a subsequent translation buffer hit.

After a physical address is obtained in a memory controller, the physical address must still be decoded in order to produce the signals necessary to access memory. One decoding operation that must be performed is the decoding of a physical address into one or more signals for selecting a memory device (or group of devices) that is mapped to the memory location sought to be accessed. This decoding operation is commonly referred to as a row decode operation because memories are often organized in rows of devices ("device rows"), with each device row being selectable independently of the other device rows.

Unfortunately, due to cumulative propagation delays inherent in a row decoding operation, row decoding usually takes relatively long time. This is significant because the row decode operation occurs after virtual-to-physical address translation is completed and therefore directly impacts the overall memory access time. Consequently, any reduction in the time required to select a device row in response to a virtual address tends to reduce memory access time and increase the overall performance of the computer system.

SUMMARY OF THE INVENTION

An apparatus and method for selecting a row of memory devices are disclosed. A row value that indicates one of a number of chip select signals is stored in a storage element that is associated with an address. A memory access request that includes the address is received, and the chip select signal indicated by the row value is asserted to select one of a number of rows of memory devices.

Other features and advantages of the invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and in which:

FIG. 3 is a table of encoded row values; and

DETAILED DESCRIPTION

It is an intended advantage of embodiments disclosed herein to reduce the amount of time required to select a device row in response to a virtual address. When a virtual address causes a translation buffer miss, a physical address is retrieved from a lookup table in a memory subsystem and stored in the translation buffer. The physical address is also supplied to a row decoder which processes the physical address to identify one of a plurality of device rows. The row decoder asserts one of a plurality of chip select signals to select the identified device row. According to one embodiment, a row value that indicates the state of the plurality of chip select signals output by the row decoder is stored in one of a plurality of row select storage elements in the translation buffer. Each of the row select storage elements is associated with a respective virtual address tag. Consequently, if a virtual address results in a translation buffer hit by matching a particular virtual address tag, the row value stored in the row select storage element associated with the virtual address tag is output from the translation buffer and used to select a device row. Because the row value output from the translation buffer may be used to generate a device row significantly faster than a physical address may be translated by the row decoder to select a device row, the time required to select a device row in response to a virtual address is significantly reduced.

It is a further intended advantage of embodiments described herein to store row values in an encoded form to lower the number of storage elements required to implement the plurality of row select storage elements. According to one embodiment, a row value is encoded prior to being stored in a row select storage element and then decoded when output from the translation buffer to select a device row. These and other intended advantages are described below.

Figure 1:
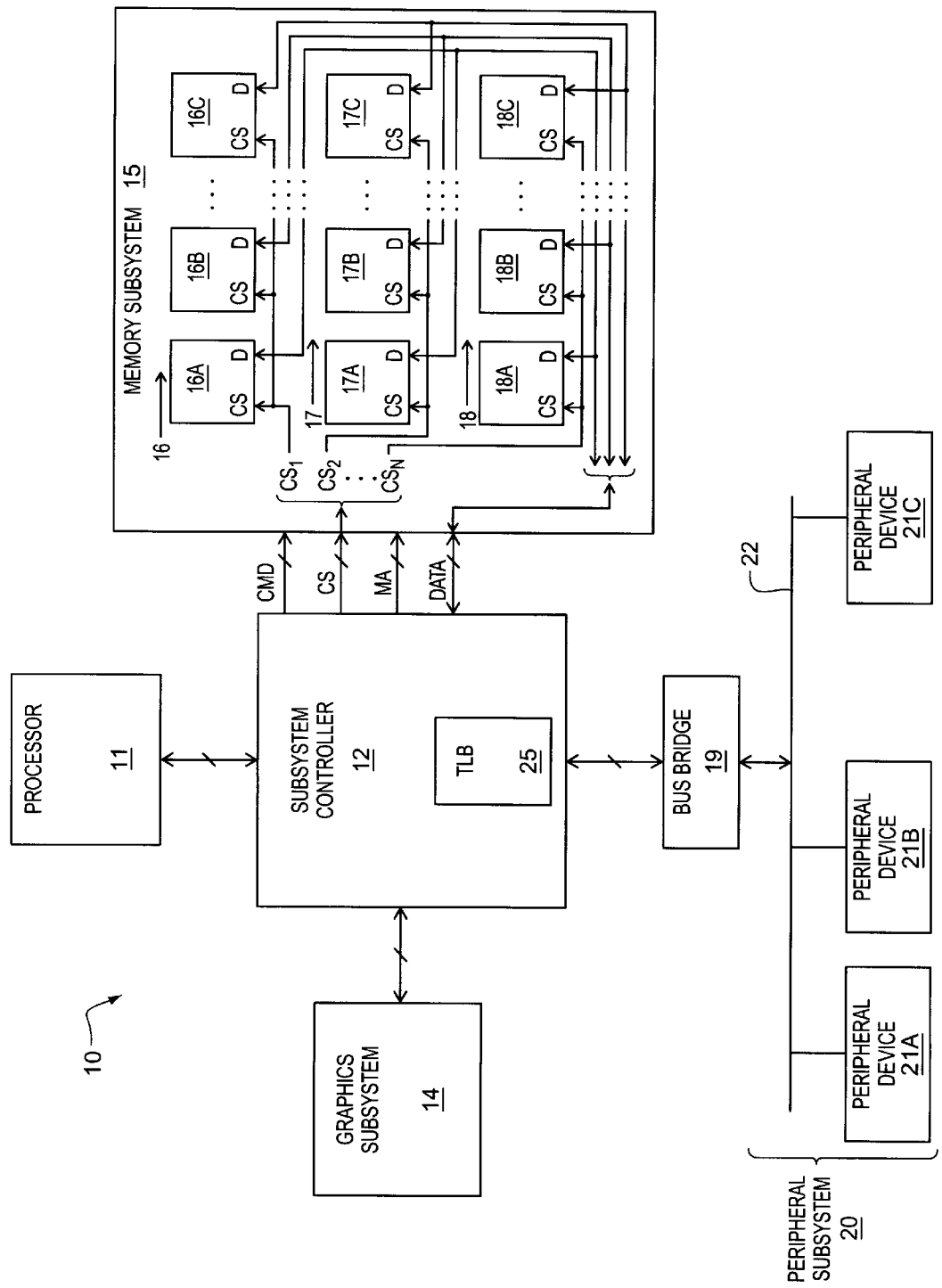
FIG. 1 is a block diagram of a computer system.

FIG. 1 is a block diagram of a computer system 10 in which virtual addressing may be used. The computer system 10 contains at least one processor 11, a graphics subsystem 14, a memory subsystem 15 and a peripheral subsystem 20, all interconnected by a subsystem controller 12. As indicated, the peripheral subsystem 20 includes a bus 22 (e.g., a Peripheral Component Interconnect (PCI) bus, an Industry Standard Architecture (ISA) bus, an Extended Industry Standard Architecture (EISA) bus, a Microchannel bus, or any other bus for transferring data and commands), peripheral devices coupled to the bus 21A, 21B, 21C and a bus bridge 19 that interconnects the bus 22 and the subsystem controller 12. The peripheral devices 21A, 21B, 21C coupled to the bus 22 may include bus master devices that are capable of initiating communications to other peripheral devices on the bus 22 and to other subsystems coupled to the subsystem controller 12, including the processor 11.

In an alternate configuration of the computer system 10, the graphics subsystem 14 may be a peripheral device on the bus 22 or the graphics subsystem 14 may be coupled directly to the memory subsystem 15. Also, the interface between the graphics subsystem 14 and the subsystem controller 12 may be an Accelerated Graphics Port (AGP) that complies with the "Accelerated Graphics Port Interface Specification" Revision 1.0 (or later revisions), published Aug. 1, 1996 by Intel Corporation of Santa Clara, Calif.

Although an important function of the subsystem controller 12 is to provide an interface between the processor 11, the graphics subsystem 14 and the peripheral subsystem 20, the subsystem controller 12 also acts as a memory controller that manages requests from the processor 11, graphics subsystem 14 and peripheral subsystem 20 to access the memory subsystem 15.

The subsystem controller 12 includes a translation buffer called a translation lookaside buffer (TLB) 25. The TLB 25 is used to store physical addresses that correspond to incoming virtual addresses. When a virtual address is received in the subsystem controller 12, the subsystem controller 12 determines if the TLB 25 contains a corresponding physical address. If so, then a TLB hit is signaled and the physical address is output from the TLB 25 and concatenated with the least significant portion of the incoming virtual address to generate an address that can be applied to access the memory subsystem 15. If an incoming virtual address does not produce a TLB hit (i.e., a TLB miss occurs), the virtual address is used to look up the corresponding physical address in a lookup table in the memory subsystem 15. The lookup table is a table of physical addresses that is constructed during system startup time when the characteristics of the memory subsystem 15 are determined.

As shown in FIG. 1, the subsystem controller 12 is coupled to the memory subsystem 15 by four primary signal paths: a command path CMD, a chip select path CS, a multiplexed address path MA and a data path DATA. The command path CMD is used by the subsystem controller 12 to issue access commands such as page activation commands, read commands and write commands to the memory subsystem 15. The multiplexed address path MA is used by the subsystem controller 12 to issue page and column addresses to the memory subsystem 15. The chip select path CS includes a plurality of chip select lines that are asserted by the subsystem controller 12 to enable access to respective device rows (also called component files) in the memory subsystem 15. The data path DATA is used to transfer data to and from the memory subsystem 15.

The memory subsystem 15 is made up of a plurality of device rows 16, 17, 18 that each include one or more discrete memory devices. For example, device row 16 includes memory devices 16A, 16B, and 16C, device row 17 includes memory devices 17A, 17B and 17C, and device row 18 includes memory devices 18A, 18B and 18C. The ellipses between memory devices in the device rows (e.g., between 16B and 16C) indicate that the number of memory devices in a device row is variable. The memory devices in the device rows 16,17,18 are typically dynamic random access memory (DRAM) devices such as fast page mode DRAM (FPM DRAM), extended data out DRAM (EDO DRAM) or synchronous DRAM (SDRAM) devices. However, other configurations of the memory subsystem 15 may be populated with other types memory devices, including other types of DRAM devices such as Rambus DRAM (RDRAM) and SyncLink DRAM (SLDRAM) devices.

Each of the one or more memory devices in a given device row 16, 17, 18 are coupled to a shared chip select line from the subsystem controller 12 and are selected by the same chip select signal. Assertion of a chip select signal on the chip select line coupled to the memory devices in a device row is referred to as selecting the device row. Thus, the subsystem controller 12 asserts chip select signal $CS_1$ to select device row 16, $CS_2$ to select device row 17 and $CS_N$ to select device row 18. When a device row 16, 17, 18 is selected, each of the memory devices in the device row is enabled to respond to signals on the command path CMD and the multiplexed address path MA. Each of the memory devices in a given device row 16, 17, 18 are coupled to a respective portion of the data path DATA so that a device row behaves like a single memory device having a data width that is the sum of the individual data widths of the memory devices in the device row. The ellipses shown between chip select signals $CS_2$ and $CS_N$ indicate that other chip select signals may be coupled to other device rows.

Figure 2:
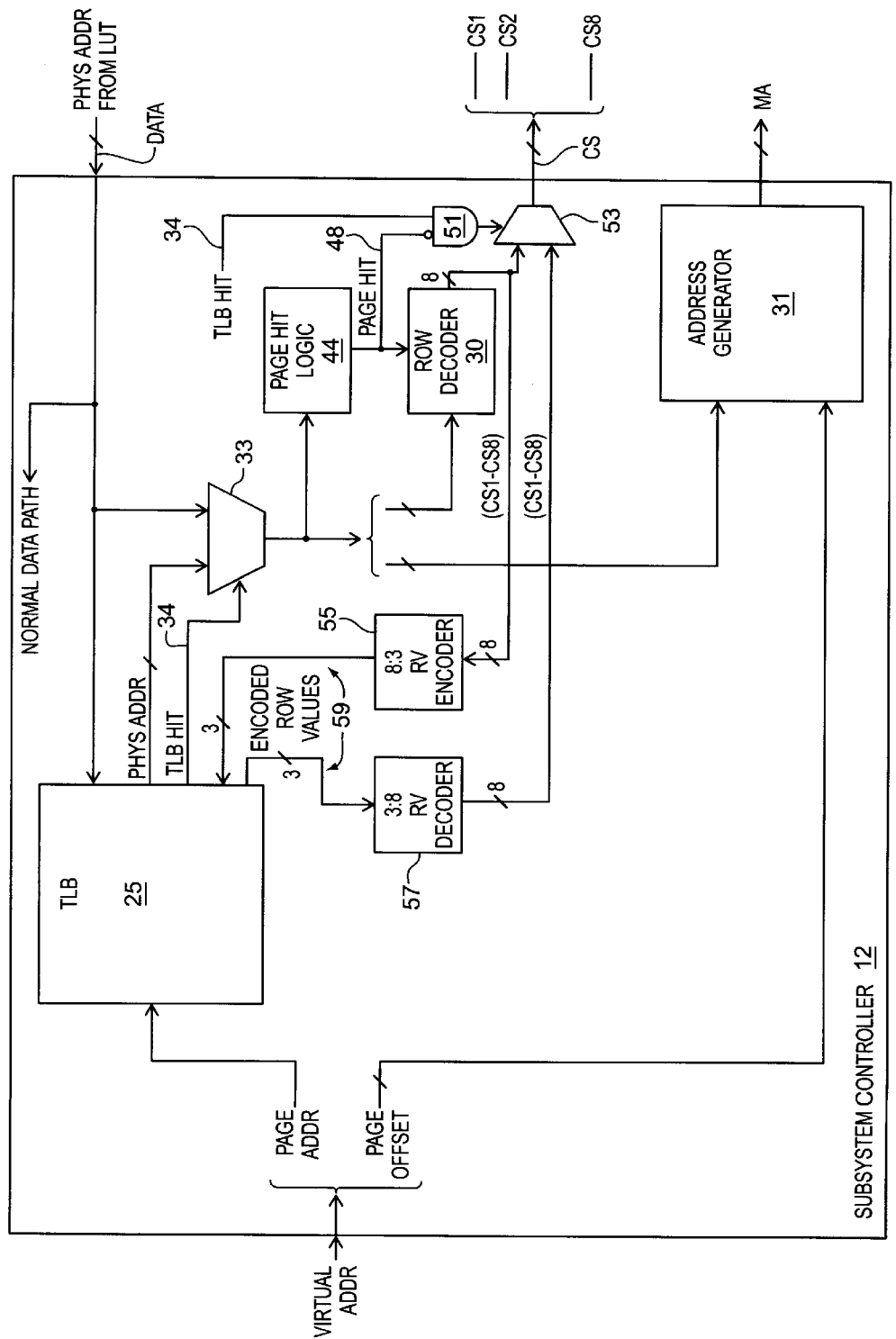
FIG. 2 is a diagram of a subsystem controller according to one embodiment.

FIG. 2 is a diagram of a subsystem controller 12 according to one embodiment. The subsystem controller 12 may be used in any device in which access to a memory subsystem is required, including a computer system as generally depicted in FIG. 1. Addresses supplied to the subsystem controller 12 from other subsystems are referred to herein as source addresses because they are used to generate additional addresses (e.g., row and column addresses) for accessing a memory subsystem. For the purpose of the following discussion, source addresses received in the subsystem controller 12 are assumed to be virtual source addresses. However, embodiments of the subsystem controller 12 include logic for distinguishing between virtual and physical source addresses and logic for accessing memory in response to either type of source address.

When a virtual source address is received in the subsystem controller 12, a virtual page address component of the virtual address is applied to the TLB 25. The TLB 25 determines if the virtual page address corresponds to a physical address stored in the TLB 25 and, if so, asserts a TLB hit signal 34. If the virtual page address does not correspond to a physical address stored in the TLB 25, the TLB 25 deasserts the TLB hit signal 34 (thereby signaling a TLB miss) and initiates access to a lookup table (LUT) in the memory subsystem to retrieve a physical address. The physical address is returned via the data path DATA and cached in the TLB 25 for use in response to subsequent source addresses that contain the same virtual page address. The physical address from the lookup table is also applied to an input of the multiplexer 33. Because a TLB miss has occurred, the TLB hit signal 34 is deasserted, thereby causing the multiplexer 33 to output the physical address retrieved from the lookup table. The physical address output by the multiplexer 33 is supplied to page hit logic 44, a row decoder 30 and an address generator 31.

The page hit logic 44 determines whether the physical address specifies a location in an open page in the memory subsystem and, if so, asserts a page hit signal 48. Herein, an open page in the memory subsystem refers to data from a row of memory cells that has been transferred to a sense amplifier bank within a memory device in the memory subsystem. According to one embodiment, the row decoder 30 receives the page hit signal 48 from the page hit logic 44 and automatically reasserts the most recently asserted chip select signal if the page hit signal 48 is asserted. That is, if a page hit occurs, the open page is assumed to be in the most recently accessed device row.

If the page hit logic 44 determines that the physical address does not specify a location in an open page of the memory subsystem, the page hit logic deasserts the page hit signal 48 to signal a page miss. As an aside, the expression "page miss" is often used to describe a memory access to a bank in a memory device that misses an already open page for that bank. In that case, a precharge operation must be performed to close the open page before the page sought to be accessed can be opened. Herein, the expression "page miss" is used more broadly to mean any memory access that does not hit an open page in a memory subsystem.

If the page hit logic 44 does not assert the page hit signal 48, then the row decoder 30 processes the physical address retrieved from the lookup table to identify which of a number of device rows in a memory subsystem to select. Typically, each of the device rows in a memory subsystem are mapped one on top of another such that the top address for one device row is just below the bottom address for another device row. At startup time, initialization program code (e.g., in a basic input output service (BIOS) device) is executed to determine the memory mapping of each of the device rows in the memory subsystem and to program respective top-of-memory values for the device rows into configuration registers in the row decoder 30. When a physical address is received in the row decoder 30, comparator logic in the row decoder 30 compares the physical address to the top-of-memory values in the configuration registers to generate respective signals indicating whether the physical address is less than (or not less than) the individual top-of-memory values. Using the signals generated by the comparator logic, elimination logic in the row decoder 30 identifies a device row that is mapped to a region of memory that encompasses the location indicated by the physical address.

The row decoder 30 selects the identified device row by asserting one of eight chip select signals $CS_1$–$CS_8$ while deasserting the remaining seven of the chip select signals. It will be appreciated that more or fewer chip select signals may be asserted in alternate embodiments. The eight chip select signals $CS_1$–$CS_8$ output by the row decoder 30 are applied to an input of a multiplexer 53 and also to the input of a row value (RV) encoder 55. According to one embodiment, the RV encoder 55 performs 8:3 encoding of the eight bit chip select signals as illustrated in the table 58 of FIG. 3. Although the table 58 indicates that the RV encoder 55 encodes the chip select signal status using sequential binary values, other encoding schemes may be used without departing from the spirit and scope of the present invention.

An encoded row value 59 is output from the RV encoder 55 and input to the TLB 25. The encoded row value 59 is stored in one of a plurality of row select storage elements in the TLB 25 that is associated with the a tag storage element that contains at least a portion of the corresponding virtual source address.

One advantage of using an encoded row value 59 to indicate the chip select signal status instead of an unencoded row value (e.g., an eight bit value that matches the chip select signal status) is that less storage is required in the TLB 25. As will be discussed, however, this storage savings comes at the cost of additional time required to decode the encoded row value to regenerate a full complement of chip select signals. Thus, in an alternate embodiment, an unencoded row value may be stored in the TLB 25 instead of an encoded row value. In yet another embodiment, a partially encoded row value may be stored in the TLB 25 (e.g., some chip select lines are encoded, while other chip select lines remain unencoded).

When a virtual source address results in a TLB hit, the TLB 25 outputs a physical address that corresponds to the page address component of the virtual source address. The TLB 25 also asserts the TLB hit signal 34 to cause the multiplexer 33 to supply the physical address from the TLB 25 to the page hit logic 44, the row decoder 30 and the address generator 31.

The TLB 25 also outputs an encoded row value 59 in response to the TLB hit. The encoded row value 59 is associated with the page address component of the virtual source address and indicates which of a plurality of device rows in the memory subsystem is to be selected for access. The encoded row value 59 is received in a 3:8 RV decoder 57 that performs the inverse function of the 8:3 RV encoder 55. That is, the RV decoder 57 decodes the encoded row value 59 into eight chip select signals $CS_1$–$CS_8$. If, as discussed above, the row value has not been encoded prior to being stored in the TLB 25 or has been only partially encoded, then no decoding or only partial decoding is performed by the RV decoder 57 to generate the eight chip select signals $CS_1$–$CS_8$. In the case of no decoding by the RV decoder 57, the RV decoder is essentially passive logic. In alternate embodiments, more or fewer chip select signals may be output by the RV decoder 57.

The purpose of the multiplexer 53 is to route the output of either the row decoder 30 or the RV decoder 57 to the chip select signal path CS in order to select a device row. Thus, the multiplexer 53, the RV decoder 57 and signal routers within the TLB 25 collectively form routing logic for asserting one of the eight chip select signals $CS_1$–$CS_8$ indicated by the encoded row value stored in the TLB 25. According to one embodiment, the RV decoder 57 is used to select a device row if a TLB hit has occurred and a page hit has not occurred. To achieve this operation, the TLB hit signal 34 and an inversion of the page hit signal 48 are logically ANDed by a logic gate 51 to control the output of the multiplexer 53. Consequently, if a TLB miss has occurred, a looked-up physical address (i.e., from a lookup table in the memory subsystem) is processed by the row decoder 30 to identify the device row to be accessed. The row decoder 30 asserts one of the eight chip select signals $CS_1-CS_8$ and deasserts the remaining seven of the chip select signals $CS_1-C_8$ according to the identified device row. The eight chip select signals output by the row decoder 30 are passed through the multiplexer 53 to select the identified device row.

As discussed above, in one embodiment of the row decoder, a page hit signal causes the row decoder to automatically reassert the most recently asserted chip select signal. Consequently, the row decoder chip select output is passed through the multiplexer 53 in response to a page hit.

Still referring to FIG. 2, a portion of the physical address output from the multiplexer 33 is also supplied to the address generator 31. In one embodiment, the address generator 31 outputs address signals via the multiplexed address path MA as described above in reference to FIG. 1. In an alternate embodiment, the address generator 31 may be configured to output address signals onto another type of memory interconnect path such as a Rambus Channel or a SyncLink bus pair. Also, although the chip select signals output by the multiplexer 33 have been described in terms of independent chip select signals that are coupled to respective device rows, the chip select signal may also be encoded values that are asserted on a shared communication path (e.g., a Rambus Channel or a SyncLink bus pair) in order to select memory devices (e.g., RDRAM or SLDRAM devices).

Herein, Rambus Channel refers to a memory interconnect path that complies with one or more specifications published by Rambus, Inc. of Mountain View, Calif. or its assigns or successors (collectively "Rambus, Inc."). Rambus DRAM refers to a memory device for coupling to a Rambus Channel and that complies with a specification published by Rambus, Inc. A SyncLink bus pair refers to a memory interconnect path that complies with one or more specifications published by the SyncLink Consortium or its assigns or successors (collectively "SyncLink Consortium"). The SyncLink Consortium was formed in 1995 by the SyncLink Trade Association. SyncLink DRAM refers to a memory device for coupling to a SyncLink bus pair. A SyncLink bus pair includes a SendLink bus for carrying command, address and write data to attached SLDRAM devices and a SinkLink bus for carrying data from the SLDRAMs back to a memory controller.

Figure 4:
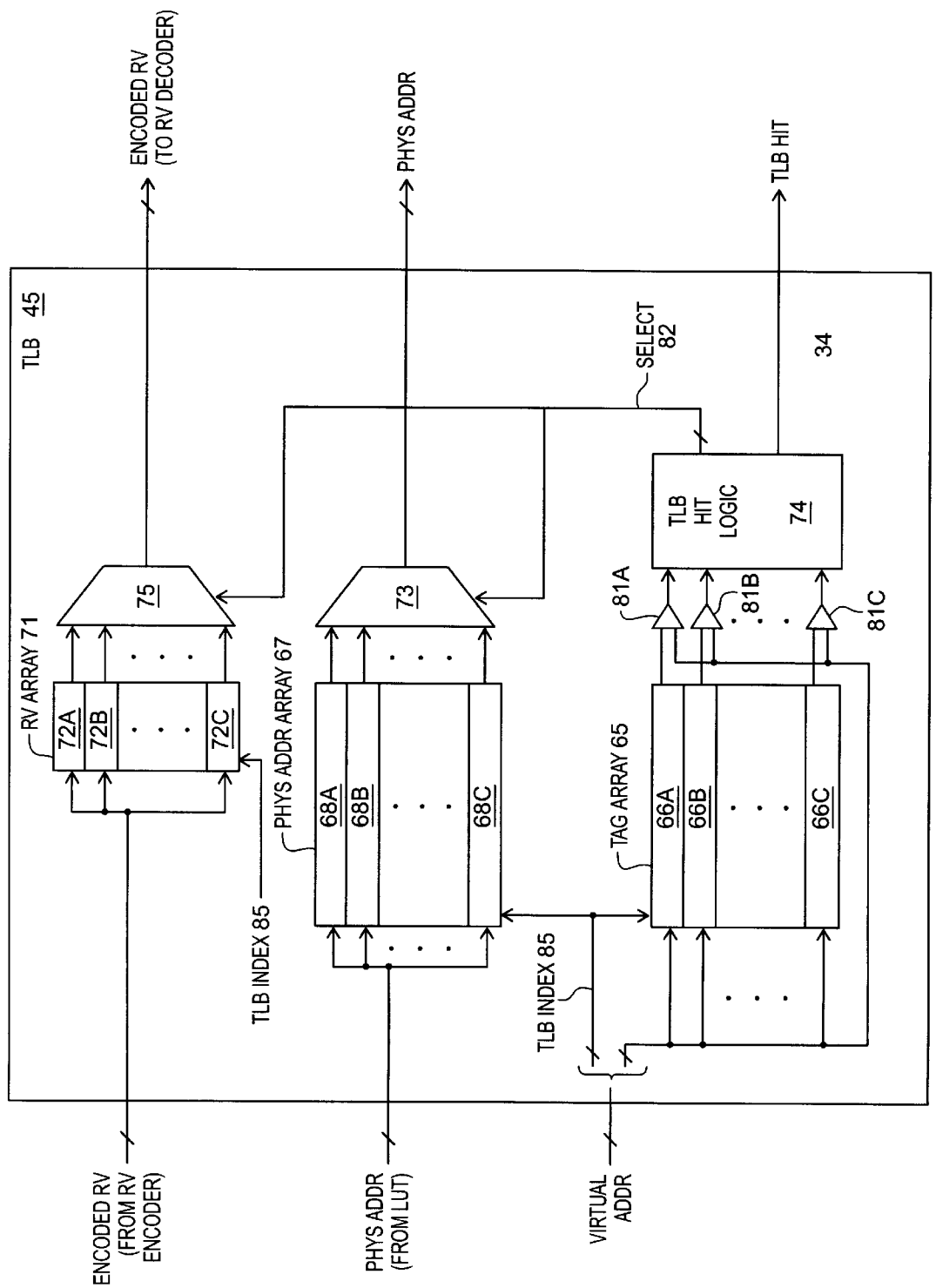
FIG. 4 is a diagram of a translation lookaside buffer according to one embodiment.

FIG. 4 is a diagram of the TLB 25 according to one embodiment. When a virtual source address (or at least the page address component of a virtual source address) is received in the TLB 25, comparators 81A, 81B, 81C compare the virtual source address against virtual address values that have been stored in a tag array 65 in response to previous TLB miss cycles. The outputs of the comparators 81A, 81B, 81C are supplied to the TLB hit logic 74. If any of the comparator outputs indicate a match, the TLB hit logic 74 asserts the TLB hit signal 34 and supplies a select signal 82 to respective control inputs of a pair of multiplexers 73, 75. In one embodiment, the select signal 82 is a multiple bit signal that indicates which of the tag array entries caused the TLB hit. The multiplexer element 73 outputs a physical address from a physical address array 67 according to the select signal 82. Similarly, the multiplexer element 75 outputs an encoded row value from a row value array 71 according to the select signal 82. In one embodiment, the tag array storage elements 66A, 66B, 66C are directly mapped to the address storage elements 68A, 68B, 68C in the physical address array 67 and to row select storage elements 72A, 72B, 72C in the row value array 71. In alternate embodiments, a multiple-way tag array may be used to select respective entries of the physical address array 67 and the row value array 71 to be output.

In one embodiment of the TLB 25, when a TLB miss occurs (i.e., none of the comparators 81A, 81B, 81C indicates a match), the page address component of the virtual source address is loaded into a storage element 66A, 66B, 66C in the tag array 65 according to a subset of the bits in the page address. This subset of bits in the page address forms a TLB index 85 that is also applied to the physical address array 67 and the row value array 71. Consequently, when a physical address is obtained from the lookup table in the memory subsystem, the physical address is stored in a storage element of the physical address array 67 that is selected by the same TLB index 85 as the storage element of the tag array 65 in which the page address component of the virtual source address is stored. Similarly, when an encoded row value is supplied by the RV encoder, the encoded row value is stored in an entry of the RV array 71 that is selected by the same TLB index 85 as the storage element of the tag array 65 in which the page address component of the virtual source address is stored. It will be appreciated that, in an embodiment in which the TLB index 85 is a subset of bits from the page address component of a virtual source address, the subset of bits which constitute the TLB index 85 do not have to be stored with the remainder of the bits of the page address in the tag array.

Although embodiments have been described herein in conjunction with virtual addresses that are translated in order to access memory, the present invention may also be used with physical addresses that require some form of address translation, such as in, for example, systems that perform a physical-to-physical address translation.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly to be regarded in an illustrative rather than a restrictive sense.

What is claimed is:

1. A method of selecting a row of memory devices, the method comprising:

storing a row value in a storage element of a translation buffer that is associated with a virtual address, the row value indicating one of a plurality of select signals identifying a row from among a plurality of rows of memory devices;

storing a physical address at the identified row to a memory device in association with the corresponding row value;

receiving a memory access request that includes the virtual address; and asserting the one of the plurality of select signals indicated by the stored row value to select the identified one of the plurality of rows of memory devices.

2. The method of claim 1 wherein asserting the one of the plurality of select signals indicated by the row signal comprises asserting the one of the plurality of select signals indicated by the row value in response to a page miss signal.

3. The method of claim 2 wherein the page miss signal indicates that the first address corresponds to a location in the memory that is not in an open page of the memory.

4. The method of claim 1 wherein the plurality of select signals includes N chip select signals and wherein the row value is a pattern of M bits that identifies one of the N chip select signals, M being less than N.

5. The method of claim 4 wherein asserting the one of the plurality of chip select signals comprises decoding the pattern of M bits into a one of the N chip select signals.

6. The method of claim 1 wherein the translation buffer comprises an address translation cache, the address translation cache including a plurality of physical addresses stored in respective address storage elements of the address translation cache and a plurality of virtual addresses stored in respective tag storage elements of the address translation cache, each of the tag storage elements being associated with a respective one of the address storage elements and a respective one of the row select storage elements.

7. The method of claim 6 wherein storing the row value in an address translation cache comprises storing the row value in one of the plurality of row select storage elements associated with the virtual address.

8. The method of claim 1 wherein asserting the one of the plurality of select signals indicated by the row value comprises:

comparing a portion of the virtual address included in the memory access request against a plurality of addresses stored in respective tag storage elements of the translation buffer to identify one of the tag storage elements that contains the portion of the virtual address; and decoding contents of one of a plurality of row select storage elements that is associated with the identified one of the tag storage elements to generate the one of the plurality of select signals, the contents of the one of the row select storage elements being the row value.

9. A method comprising:

asserting one of a plurality of select signals indicated by a virtual address to select one of a plurality of rows of memory devices in a memory subsystem;

storing in a storage element of a translation buffer associated with the virtual address a value that indicates the one of the plurality of select signals;

storing in a storage element of the translation buffer, associated with the virtual address, a physical address at the selected row;

receiving a request to access a location in the memory that is within a range of locations defined by the virtual address; and asserting the one of the plurality of select signals indicated by the value in the storage element to select the one of the plurality of rows of memory devices.

10. The method of claim 9 wherein asserting the one of the plurality of select signals indicated by the value in the storage element comprises asserting the one of the plurality of select signals indicated by the value in the storage element in response to a page miss signal, the page miss signal indicating that the request to access a location in the memory is a request to access a location that is not in an open page of the memory.

11. The method of claim 9 wherein the plurality of select signals includes N chip select signals and wherein the value in the storage element is a pattern of M bits that identifies one of the N chip select signals, M being less than N.

12. The method of claim 11 wherein asserting the one of the plurality of chip select signals indicated by the value in the storage element comprises decoding the pattern of M bits into a one of the N chip select signals.

13. A memory controller comprising:

a row decoder to generate a row value that indicates one of a plurality of select lines;

a translation buffer coupled to the row decoder to receive the row value from the row decoder and to store the row value in a location associated with a virtual address and a physical address, the physical address being at a memory device associated with the row value; and routing logic coupled to the translation buffer to assert the one of the plurality of select lines indicated by the row value stored in the buffer in response to a memory access request that includes the virtual address.

14. The memory controller of claim 13 further comprising encoding logic coupled to receive the row value from the row decoder and to encode the row value into an encoded form before the row value is stored in the translation buffer, the encoded form of the row value containing fewer bits than the row value generated by the row decoder.

15. The memory controller of claim 14 wherein the routing logic includes decoding logic to receive the row value from the buffer in the encoded form and to decode the row value into a plurality of chip select signals.

16. The memory controller of claim 13 wherein the translation buffer is a cache comprising:

a tag array that includes a plurality of tag storage elements to store respective virtual addresses; and a row value array that includes a plurality of row value storage elements to store respective row values.

17. The memory controller of claim 16 wherein each of the tag storage elements are associated with a respective one of the row storage elements by an index value that is used to address the tag array and the row value array.

18. The memory controller of claim 13 wherein the virtual address is a subset of bits from an address that has been received in the memory controller.

19. A memory controller comprising:

decode means for generating a row value that indicates one of a plurality of select lines;

translation buffer means coupled to the decode means for receiving the row value from the decode means and for storing the row value in a location associated with a virtual address and a physical address, the physical address being at a memory device associated with the row value; and routing means coupled to the translation buffer means for asserting the one of the plurality of select lines indicated by the row value stored in the translation buffer means in response to a memory access request that includes the virtual address.

20. The memory controller of claim 19 further comprising encoding means for receiving the row value from the decode means and for encoding the row value into an encoded form before the row value is stored in the buffer means, the encoded form of the row value containing fewer bits than the row value generated by the decode means.

21. A memory controller comprising:

an interface to couple the memory controller to a plurality of memory devices, each device having a row and a physical address;

a decoder to generate a value that indicates the row of one of the plurality of memory devices;

a translation buffer coupled to the decoder to receive the value from the decoder and to store the value in a storage element associated with the physical address and a virtual address; and logic coupled to the translation buffer to assert a plurality of signals at the interface to select one of the plurality of memory devices indicated by the value.

22. The memory controller of claim 21 wherein the interface is an interface to a Rambus Channel.

23. The memory controller of claim 22 wherein each of the plurality of memory devices is a Rambus dynamic random access memory device (RDRAM).

24. The memory controller of claim 21 wherein the interface is an interface to a SyncLink bus pair.

25. The memory controller of claim 24 wherein each of the plurality of memory devices is a SyncLink dynamic random access memory device (SLDRAM).

26. A machine-readable medium having stored thereon data representing sequences of instructions which, when executed by a machine, cause the machine to perform operations comprising:

storing a row value in a storage element of a translation buffer that is associated with a virtual address, the row value indicating one of a plurality of select signals identifying a row from among a plurality of rows of memory devices;

storing a physical address at the identified row to a memory device in association with the corresponding row value;

receiving a memory access request that includes the virtual address; and asserting the one of the plurality of select signals indicated by the stored row value to select the identified one of the plurality of rows of memory devices.

27. The medium of claim 1 wherein the instructions for asserting the one of the plurality of select signals indicated by the row signal further comprises instructions causing the machine to perform operations comprising asserting the one of the plurality of select signals indicated by the row value in response to a page miss signal.

28. The medium of claim 1 wherein the instructions for asserting the one of the plurality of select signals further comprises instructions causing the machine to perform operations comprising decoding the select signal from a pattern of M bits into a one of N chip select signals.

29. The medium of claim 1 wherein the instructions further comprise instructions causing the machine to perform operations comprising storing a plurality of virtual addresses in respective tag storage elements of the translation buffer, each of the tag storage elements being associated with a respective one of the physical addresses and a respective one of the row values.

30. The medium of claim 1 wherein the instructions for asserting the one of the plurality of select signals indicated by the row value further comprises instructions causing the machine to perform operations comprising:

comparing a portion of the virtual address included in the memory access request against a plurality of addresses stored in respective tag storage elements of the translation buffer to identify one of the tag storage elements that contains the portion of the virtual address; and decoding contents of one of a plurality of row select storage elements that is associated with the identified one of the tag storage elements to generate the one of the plurality of select signals, the contents of the one of the row elect storage elements being the row value.

* * * * *